United States Patent
Bae (10) Patent No.: US 8,516,088 B2
(45) Date of Patent: Aug. 20, 2013

(54) HOST APPARATUS, IMAGE FORMING APPARATUS AND METHOD TO SETUP FOLDER SHARE SERVICE

(75) Inventor: Sung-hoon Bae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1127 days.

(21) Appl. No.: 12/051,943

(22) Filed: Mar. 20, 2008

(65) Prior Publication Data

US 2009/0024931 A1 Jan. 22, 2009

(30) Foreign Application Priority Data

Jul. 20, 2007 (KR) .......................... 10-2007-72856

(51) Int. Cl.
*G06F 15/177* (2006.01)

(52) U.S. Cl.
USPC ............ 709/221; 358/1.14; 358/1.15; 726/27

(58) Field of Classification Search
USPC ......... 709/201–203, 220–227, 200; 715/203, 715/236, 735, 740–747, 751; 358/1.14–1.15, 358/402–407; 726/27–30
See application file for complete search history.

(56) References Cited

U.S. PATENT DOCUMENTS

| | | | | |
|---|---|---|---|---|
| 7,075,670 | B1 * | 7/2006 | Koga | 358/1.15 |
| 7,127,470 | B2 * | 10/2006 | Takeya | 707/805 |
| 7,136,903 | B1 * | 11/2006 | Phillips et al. | 709/217 |
| 7,171,468 | B2 * | 1/2007 | Yeung et al. | 709/225 |
| 7,240,122 | B2 * | 7/2007 | Sato | 709/232 |
| 7,299,502 | B2 * | 11/2007 | Schmeling et al. | 726/29 |
| 7,320,033 | B2 * | 1/2008 | Bradfield et al. | 709/225 |
| 7,447,994 | B2 * | 11/2008 | Mase et al. | 715/735 |
| 7,607,164 | B2 * | 10/2009 | Vasishth et al. | 726/1 |
| 7,664,829 | B2 * | 2/2010 | Yamamoto et al. | 709/217 |
| 7,725,474 | B2 * | 5/2010 | Tamai et al. | 707/758 |
| 7,908,648 | B2 * | 3/2011 | Ellington | 726/6 |
| 2003/0084132 | A1 * | 5/2003 | Ohta | 709/221 |
| 2004/0184070 | A1 * | 9/2004 | Kiraly et al. | 358/1.15 |
| 2005/0134896 | A1 * | 6/2005 | Koga | 358/1.14 |
| 2006/0129654 | A1 * | 6/2006 | Sato | 709/213 |
| 2007/0159652 | A1 * | 7/2007 | Sato | 358/1.15 |
| 2009/0138808 | A1 * | 5/2009 | Moromisato et al. | 715/758 |

* cited by examiner

*Primary Examiner* — Greg C Bengzon
(74) *Attorney, Agent, or Firm* — Stanzione & Kim, LLP (57) ABSTRACT

A host apparatus, a device, and a method to setup a folder share service. A controller to control displaying a user interface (UI) screen to select a device using the folder share service and a shared folder, and a UI screen to set permissions of the selected shared folder corresponding to at least one added user account and to set store options of a file to be stored to the shared folder in a display. A first communication portion transmits setup information of the user account to the device.

15 Claims, 11 Drawing Sheets

```
Name: BRARS3095450501<00>  (Workstation/Redirector)
 Name flags: 0x4c00  (M-node, unique, in conflict, active)
   0... .... .... ....  = Unique name
   .10. .... .... ....  = M-node
   ...0 .... .... ....  = Name is not being deregistered
   .... 1... .... ....  = Name is in conflict
   .... .1.. .... ....  = Name is active
   .... ..0. .... ....  = Not permanent node name
```

FIG. 11

HOST APPARATUS, IMAGE FORMING APPARATUS AND METHOD TO SETUP FOLDER SHARE SERVICE

CROSS-REFERENCE TO RELATED APPLICATIONS

This application claims priority under 35 U.S.C. §119(a) from Korean Patent Application No. 2007-72856, filed on Jul. 20, 2007, in the Korean Intellectual Property Office, the disclosure of which is incorporated herein in its entirety by reference.

BACKGROUND OF THE INVENTION

1. Field of the Invention

The present general inventive concept relates generally to a host apparatus, a device, and a method to setup a folder share service. More particularly, the present general inventive concept relates to a host apparatus, a device, and a method to setup a folder share service provided to the device after the host apparatus sets information required for the folder share service.

2. Description of the Related Art

With advances of communication technology, service enabling an image forming apparatus and a host to share and transceive a folder of the host is being researched. The host is a server supporting the share folder, and the image forming apparatus is an apparatus such as printer, scanner, fax machine, and multifunction printer. An example of the service enables transmitting and storing digital data generated by scanning at the image forming apparatus to the shared folder of the host. A protocol supporting the folder share service to share the folder of the host and to send files, is a server message block (SMB) protocol.

Figure 1:
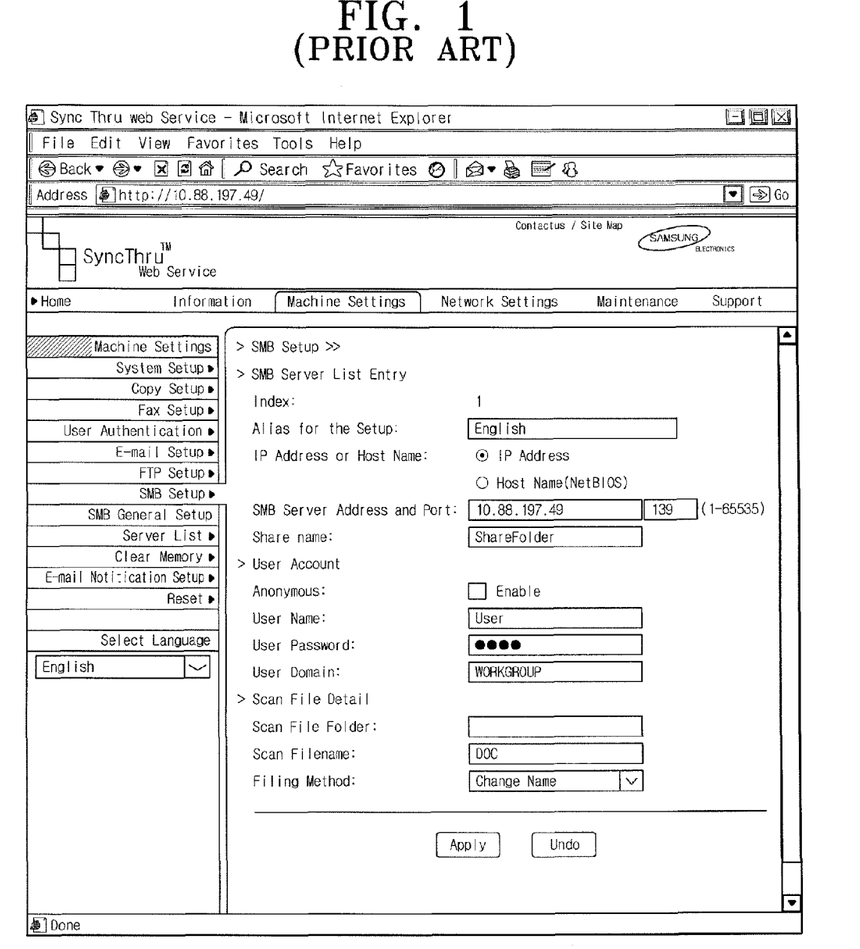
FIG. 1 is a diagram illustrating host information set by a user in a web UI provided by an image forming apparatus to provide a conventional folder share service.

Using the folder share service with the SMB, a user needs to set host information in a web user interface (UI) provided by the image forming apparatus or in a local panel UI provided by the apparatus as illustrated in FIG. 1. The host information is information required to share the folder. The host information includes various information such as host ID, host IP address or host name, port number, name of the shared folder, names of sub-folders of the shared folder, user ID and password, and user domain. The user needs to know all the information to input the information through the web UI.

To set the information in the web UI, the user needs to preset the information to the host through a plurality of UI. For instance, when the shared folder is not designated in the host, the user cannot input the name of the shared folder in the web UI. Through the complicated steps in the UIs, the user presets various information relating to the host, such as user account add, security level setup, shared folder setup, write/read permission setup of the shared folder, and user permission setup, and inputs actual host information in the web UI based on the preset information.

However, the setup method of FIGS. 1 is quite complicated for the general user to set the host information for seamless communications between the image forming apparatus and the host. Even when the user sets up for the communications, if a problem occurs in the communications between the host and the image forming apparatus, acquiring a cause of the problem by the user is difficult. Particularly, when the problem is caused by the information preset to the host, the user cannot address the problem at the image forming apparatus.

As discussed above, as setting the information at the host and inputting the information in the web UI based on the set information, the user needs to set information for each image forming apparatus. To add the user permission in Windows operating system, the user needs to change the options of the parent folder rather than the shared folder. In this situation, the user, who has no knowledge of the permission add, does not know which option is to be changed.

SUMMARY OF THE INVENTION

The present general inventive concept provides a host apparatus, a device, and a method to set a folder share service to set necessary information fast and accurately by briefly setting the necessary information for the folder share service at a host apparatus operating as a server and transmitting the information to a device operating as a client.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a host apparatus for a folder share service setup including a display, a controller to control displaying a user interface (UI) screen to select a device using the folder share service and a UI screen to set permissions of the selected shared folder corresponding to at least one added user account and to set store options of a file to be stored to the shared folder in the display, and a first communication portion to transmit setup information of the user account to the device.

The host apparatus may further include a verifier to verify whether the folder share service is available by the set user permissions and the file store options, and a service controller to control the verifier to verify the folder share service.

When the added user account is an anonymous account, the verifier may set a security option to allow the anonymous account to use the shared folder.

The file to be stored to the shared folder may include at least one of data scanned at the device, print data, e-mail transceiving data, and faxed data.

The foregoing and/or other aspects and utilities of the general inventive concept may also be achieved by providing a device to setup a folder share service including a second confirmer to confirm an Internet protocol (IP) and a port number used by a host apparatus using a network address of the host apparatus received from the host apparatus to serve as a server, a second communication portion to connect to a first communication portion using the confirmed IP and port number, a second storage to store the modified setup information and the network address, and a third confirmer to access a shared folder of the host apparatus using the modified setup information and checking whether reading and writing are permitted in the shared folder. When the device fails to read and write, the host apparatus may modify permissions to allow the reading and the writing.

The network address may include one of a host name and a NetBIOS name, a domain name system (DNS) address, and a Windows Internet name service (WINS) address, and the second confirmer may confirm the IP and the port number using the one of the host name and the NetBIOS name.

The third confirmer may receive a file list from the shared folder using a control protocol, read a file list from the shared folder using a folder share service protocol, and determine that the reading is allowed when the received file list matches the read file list.

The foregoing and/or other aspects and utilities of the general inventive concept may also be achieved by providing a folder share service setup method, the method including selecting a device using a folder share service and a shared folder of a server, setting, at the server, permissions of the selected shared folder corresponding to a user account and setting store options of a file to be stored to the folder, and transmitting setup information for the user account to the device.

The permission setting operation may set to add at least one user account.

The folder share service setup method may further include verifying whether the folder share service is available by the set permissions and the file store options.

The verifying operation may include when the added user account is an anonymous account, setting a security option to allow the anonymous account to use the shared folder.

A device capability requesting and receiving operation and a testing operation may be performed according to different protocols.

The test and the folder share service may be performed according to a server message block (SMB) protocol.

The device capability requesting and receiving operation may be performed according to one of a hypertext transfer protocol (HTTP), a simple network management protocol (SNMP), and a TELNET.

The folder share service setup method may further include when a security level of the server is different from a security level of the device, adjusting the two security levels to the same level.

The folder share service setup method may further include informing a user of the setup information set for the folder share service.

The file to be stored to the shared folder may include at least one of data scanned at the device, print data, e-mail transceiving data, and faxed data.

The foregoing and/or other aspects and utilities of the general inventive concept may also be achieved by providing a folder share service setup method, the method including confirming an Internet protocol (IP) and a port number of a host apparatus using a network address received from the host apparatus which serves as a server, connecting, at a device, to the host apparatus using the confirmed IP and port number, accessing a shared folder of the host apparatus using modified setup information and checking whether reading and writing are allowed in the shared folder, when the reading and the writing are not allowed, modifying, at the host apparatus, permissions to allow the reading and the writing, and setting the modified setup information to the device.

The reading checking operation may include receiving, at the device, a file list stored to a shared folder of the host apparatus using a control protocol, reading, at the device, a file list from the shared folder of the host apparatus using a folder share service protocol, and when the received file list matches the read file list, determining that the reading is permitted. The folder share service setup method may further include when a security level of the host apparatus is different from a security level of the device, adjusting the two security levels to a same level.

The foregoing and/or other aspects and utilities of the general inventive concept may also be achieved by providing a method of setting up a folder share service, the method including requesting a controller to generate one or more user interfaces, generating the one or more user interfaces, automatically setting permissions to allow reading and writing of a shared folder based on input through the one of the user interface by a user, setting store options of a file based on input through an other user interface by the user, and determining whether a request is made for verification of availability of the folder share service such that transmitting the permissions and the file store options to a device when a determination is made that the request was not made, and controlling a verifier to perform the verification and requesting the verification to the device when the determination is made that the request was made.

BRIEF DESCRIPTION OF THE DRAWINGS

These and/or other aspects and advantages of the general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
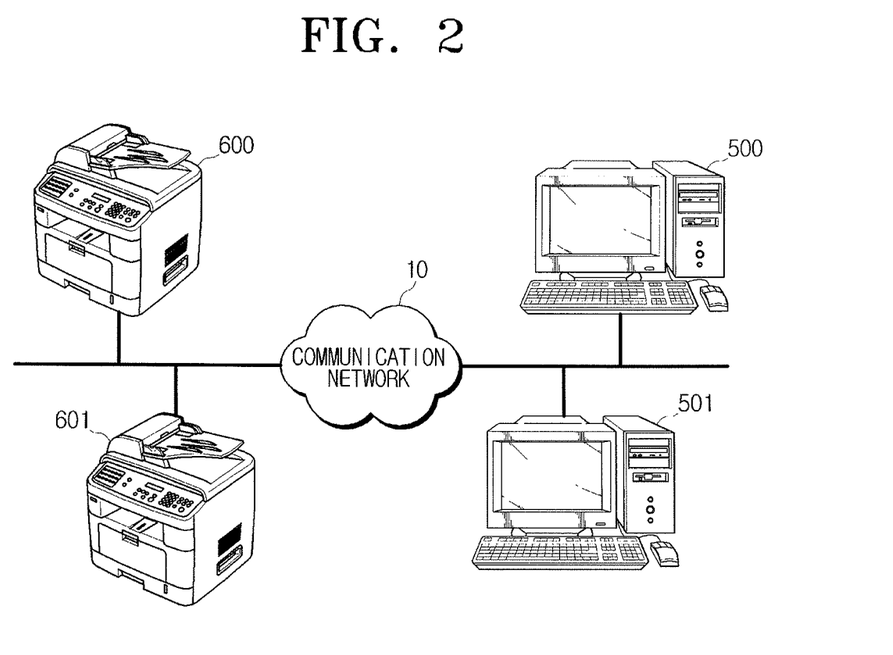
FIG. 2 is a diagram illustrating a system to setup a folder share service according to an embodiment of the present general inventive concept.

FIG. 2 depicts a system to setup a folder share service according to an embodiment of the present general inventive concept.

In FIG. 2, host apparatuses 500 and 501 are communicatively connected to a plurality of devices 600 and 601 over a communication network 10. The number of the host apparatus 500 and 501 and the number of the devices 600 and 601 are plural and not limited to two. The host apparatuses 500 and 501 function as servers to provide a folder share service. The devices 600 and 601 function as clients which use the folder share service. The communication network 10 can be a wired or wireless network.

The devices 600 and 601 can be image forming apparatuses such as scanners, printers, fax machines, and multifunction printers, and any other electronic devices capable of storing a file to a shared folder of the host apparatuses 500 and 501 or reading a file stored to the host apparatuses 500 and 501.

Examples of the folder share service include a service to store data generated at the devices 600 and 601 to the shared folder of the host apparatuses 500 and 501, and a service to receive data stored to the shared folder at the devices 600 and 601 and performing the printing, the faxing, and the data forwarding. The folder share service is supported by a sever message block (SMB) protocol. Devices of various operating systems such as Windows, Linux, and Mac can provide the folder share service.

The SMB protocol enables the host apparatuses 500 and 501 and the devices 600 and 601 to share the folder of the host apparatuses 500 and 501 and to transceive a file. For instance, the devices 600 and 601 can send and write digital data of the scanned document to a folder of the host apparatuses 500 and 501 (Scan to SMB). The devices 600 and 601 can provide services such as SMB printing of the digital data in the shared folder from the host apparatuses 500 and 501 at the devices 600 and 601, faxing, or digital data forwarding to another device.

For the folder share service, a user or an administrator (hereafter, referred to as a user) selects a shared folder at the host apparatuses 500 and 501 respectively, selects a device permitted to use the shared folder, and sets various setup information for the service. The setup information is transmitted and automatically set to the selected device. Hence, the user can easily set the necessary information for the folder share service at the devices 600 and 601 without going through the complicated operations of FIG. 1.

Figure 3:
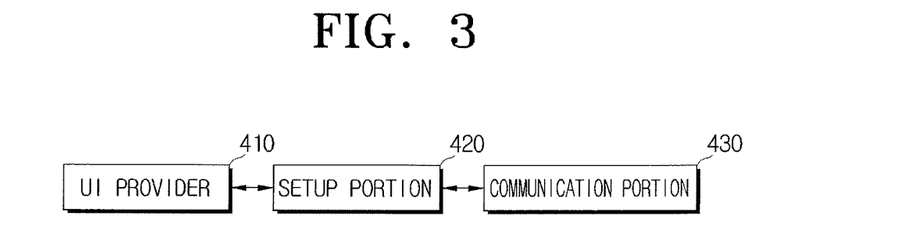
FIG. 3 is a simplified block diagram illustrating a host apparatus to setup the folder share service according to an embodiment of the present general inventive concept.

FIG. 3 is a simplified block diagram illustrating a host apparatus to setup the folder share service setup according to an embodiment of the present general inventive concept. The host apparatus of FIG. 3 includes a user interface (UI) provider 410, a setup portion 420, and a communication portion 430. The host apparatus of FIG. 3, for example, can be one of the host apparatuses of FIG. 2.

The UI provider 410 provides UI screens to select and set the device which will use the folder share service, and the shared folder.

When a user account permitted to access the shared folder is added, the setup portion 420 sets permissions of the shared folder such as read permission and write permission, to the added user account. The setup portion 420 sets file properties, that is, sets store options of a file to be stored to the shared folder.

The communication portion 430 transmits setup information including the permissions for the user account set at the setup portion 420, the file properties, and a security level preset at the host apparatus to devices.

Figure 4:
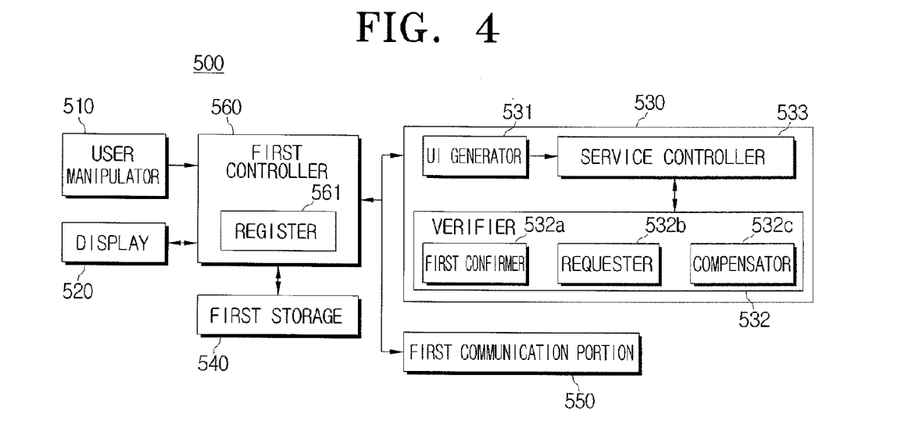
FIG. 4 is a block diagram illustrating a host apparatus to setup the folder share service according to another embodiment of the present general inventive concept.
Figure 5:
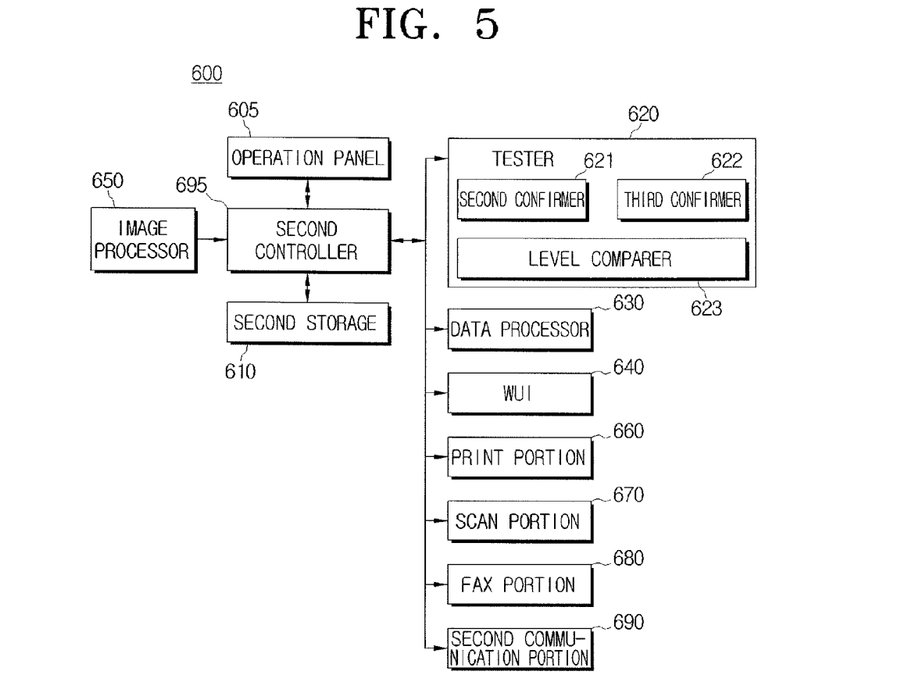
FIG. 5 is a simplified block diagram illustrating a first device of a plurality of devices of FIG. 3.

FIG. 4 is a block diagram illustrating a host apparatus to setup the folder share service according to another embodiment of the present general inventive concept, and FIG. 5 is a simplified block diagram illustrating a first device of the plurality of devices of FIG. 2.

The host apparatus 500 of FIG. 4 includes a user manipulator 510, a display 520, a service provider 530, a first storage 540, a first communication portion 550, and a first controller 560.

The user manipulator 510, which is a user interface such as keyboard, mouse, button, and touch panel, receives various information and various requests from the user. The display 520 displays UI screens generated at a UI generator 531. The display 520 can be implemented using various display panels such as liquid crystal display (LCD), cathode ray tube (CRT), and plasma display panel (PDP).

The first storage 540 contains control programs required to realize the functions of the host apparatus 500. For example, the first storage 540 contains an operating system such as Windows, Linux, and Mac to operate the host apparatus 500, Internet Explorer for the web browsing, and a program such as Netscape. In addition, a manager program for the folder share service is stored and installed to the first storage 540. The first storage 540 includes at least one shared folder which contains files and data received from the devices 600 and 601. The first storage 540 contains information set at the service provider 530, to be explained.

The service provider 530 sets and modifies necessary information of the folder share service. For doing so, the service provider 530 includes the UI generator 531, a verifier 532, and a service controller 533.

The UI generator 531 generates a UI screen to select a device which will use the folder share service and the shared folder, and a UI screen to set properties of a file stored to the shared folder. For example, when the stored file is the scanning file, the file properties can include a file format, a resolution, a file name extension, and a color.

When the user executes the manager program installed to the first storage 540, the manager program provides a second UI screen to add a device. The UI generator 531 of the manager program provides the second UI screen enabling the user to input the address of the device in person, or to search for the devices 600 and 601 connected over the communication network 10.

Figure 6A:
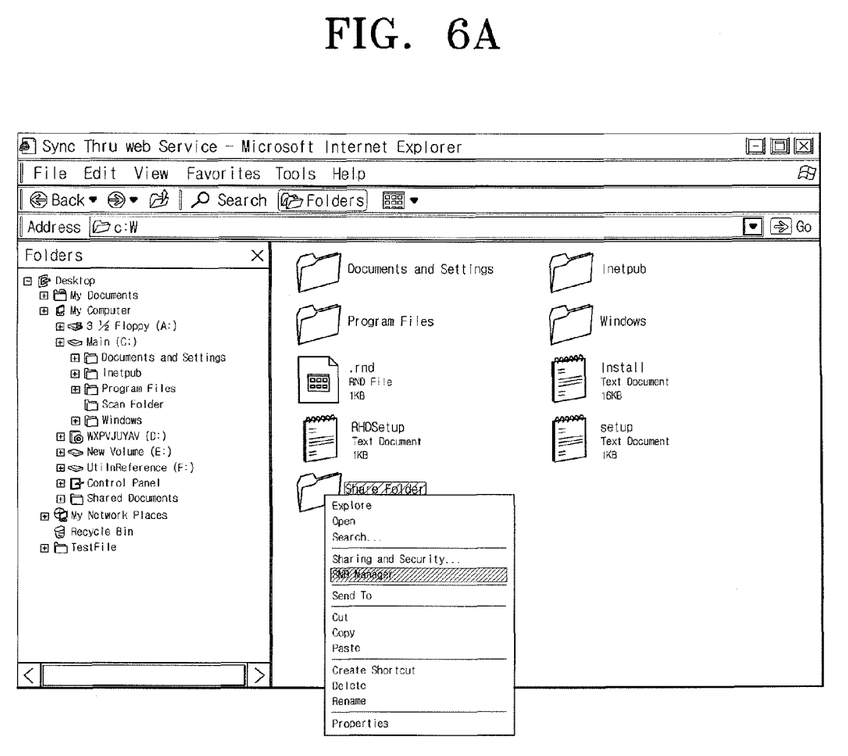
FIG. 6A is a diagram illustrating a first UI screen for a manager program execution.
Figure 6B:
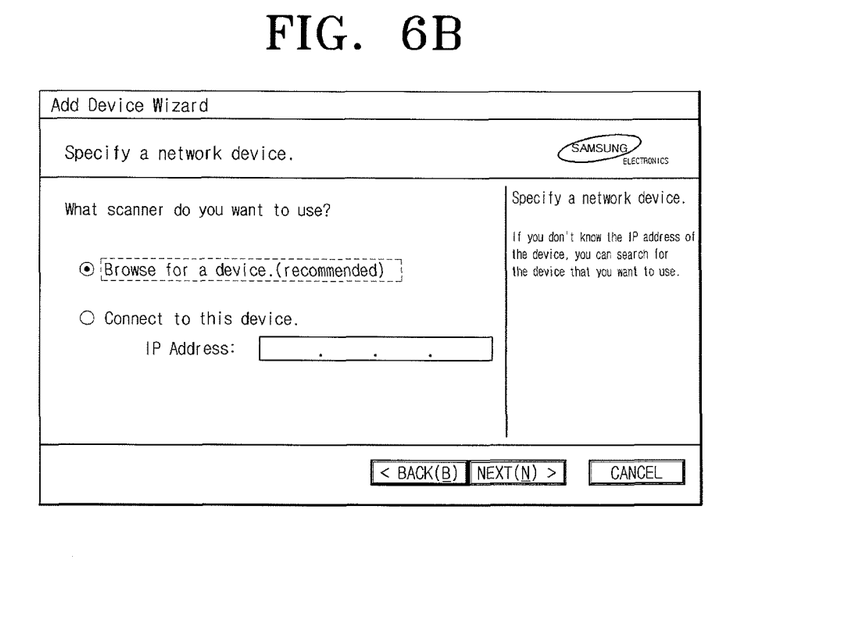
FIG. 6B is a diagram illustrating a second UI screen provided by a UI generator.
Figure 6C:
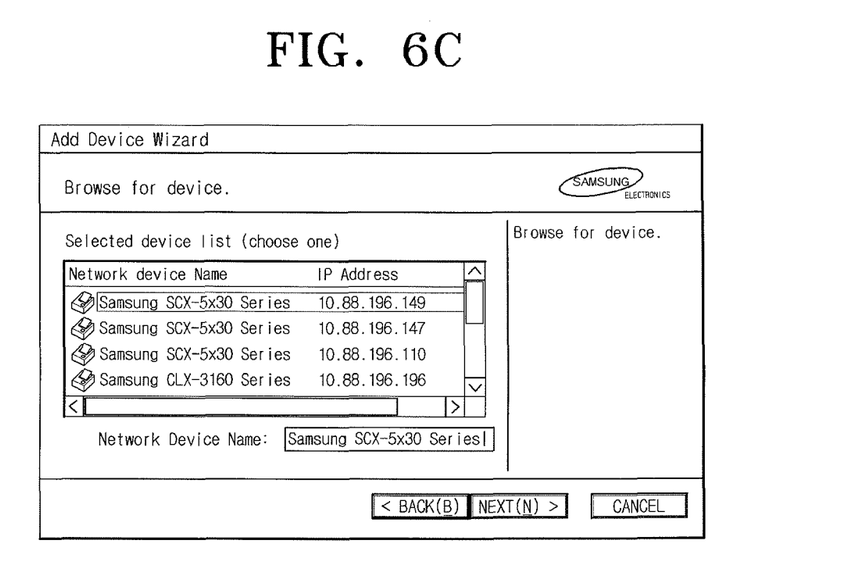
FIG. 6C is a diagram illustrating a third UI screen to select a device for the folder share service.

FIG. 6A depicts a first UI screen for the manager program execution, FIG. 6B depicts a second UI screen provided by the UI generator, and FIG. 6C depicts a third UI screen to select the device for the folder share service.

Referring to FIGS. 4, 6A, 6B and 6C, the user requests to select and execute the manager program by manipulating the user manipulator 510 in the first UI screen of the host apparatus 500. Accordingly, the UI generator 531 controls to display the second UI screen in the display 520. To select one device in person, the user selects 'Connect to this device' and inputs IP of the intended device. To search multiple devices at one time, the user selects 'Browse for a device'. After the selection, when the UI generator 531 generates the third UI screen of FIG. 6C, the user selects one or more devices to use the folder share service. Address information of the selected device (e.g., IP) is stored to the first storage 540. In the following, the first device 600 is illustrated as the selected device by way of example.

Figure 7A:
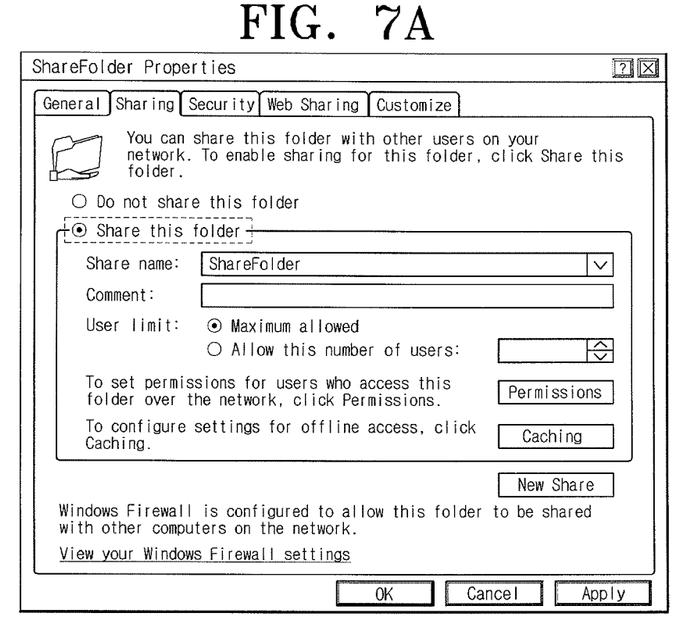
FIG. 7A is a diagram illustrating a fourth UI screen to select the shared folder.

When the first device 600 (FIG. 5) is selected, the UI generator 531 generates and displays the fourth UI screen of FIG. 7A to add the user account in the display 520. FIG. 7A depicts the fourth UI screen to select the shared folder, FIG. 7B depicts a fifth UI screen for the user permission setup, and FIG. 7C depicts a sixth UI screen to set a group of the user account.

Figure 7B:
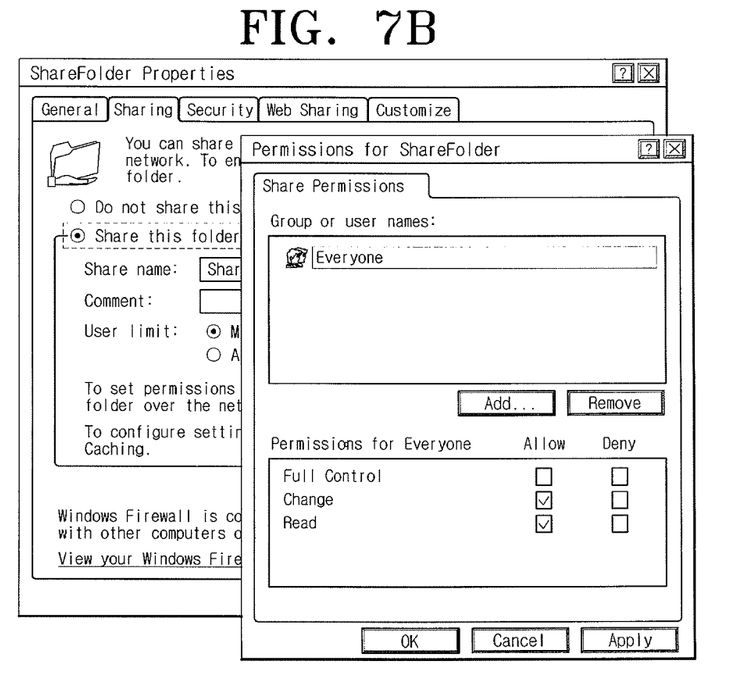
FIG. 7B is a diagram illustrating a fifth UI screen for the user permission setup.
Figure 7C:
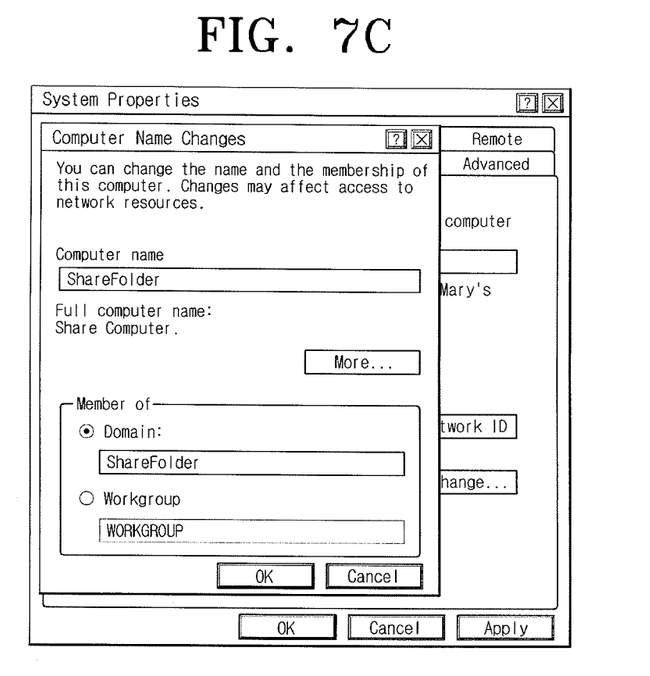
FIG. 7C is a diagram illustrating a sixth UI screen to set a group of a user account.

Referring to FIGS. 4, 7A, 7B and 7C, after selecting a shared folder among the folders set at the host apparatus 500, the user presses 'Permissions' button to set the user permissions for the selected share folder. The selected share folder is stored to the first storage 540 in association with the manager program by the service controller 533. When the 'Permissions' button is pressed, the UI generator 531 generates the fifth UI screen to add the user account as illustrated in FIG. 7B.

When the user account is added in the fifth UI screen, the service controller 533 automatically sets the permissions of the added user account, that is, the read permission and the write permission to the user account. The user can change the permissions of the user account. The service controller 533 can differently set and store user information according to a group of the added user account. For example, the group of the user account includes Domain or Workgroup as illustrated in FIG. 7C.

When the multiple user accounts are added, the service controller 533 can simultaneously set the permissions to the user accounts using 'Full Control' function. The set permissions are stored to the first storage 540 by the service controller 533. In doing so, the service controller 533 may automatically set properties of the selected share folder, that is, automatically enable to read and write the shared folder. Thus, the user does not have to separately set the properties of the shared folder.

Figure 8:
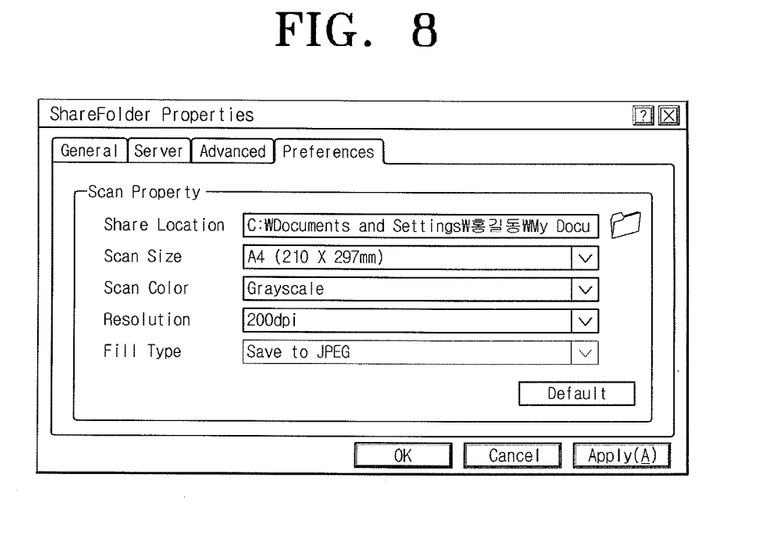
FIG. 8 is a diagram illustrating a seventh UI screen to set file store options.

When the shared folder is selected and the user account is added as above, the UI generator 531 generates a UI screen to set store options of the file to be stored to the shared folder. FIG. 8 depicts a seventh UI screen to set the file store options.

Referring to FIGS. 4, 5 and 8, when a file scanned at the first device 600 is stored to the shared folder, the UI generator 531 provides the UI to set the store options of the file scanning. The UI generator 531 can provide a different UI depending on the properties of the file transmittable from the selected device to the host apparatus 500. Notably, the UI is applicable to every file unless 'Scan' is displayed in FIG. 8. The store options of the set file are stored to the first storage 540.

The first communication portion 550 transmits setup information including the permissions of the user account, the folder properties, the file properties, and the preset security level of the host apparatus 500 to the first device 600.

The first controller 560 controls the above operations using the control programs stored to the first storage 540 such as non-volatile memory.

Before or after the setup information is transmitted to the first device 600, the verifier 532 examines whether the folder share service can be provided by the generated setup information. For doing so, the verifier 532 includes a first confirmer 532a, a requester 532b, and a compensator 532c.

The first confirmer 532a checks whether the host apparatus 500 can provide the folder share service using information of a register 561. For instance, when the operating system of the host apparatus 500 is Windows, the first confirmer 532a checks whether services provided by Windows are executed, through the UI of FIG. 9A. After confirming the service status, the first confirmer 532a requests automatic execution of non-executed service to the first controller 560 or provides a confirm message so that the user can manually start the non-executed service.

Figure 9A:
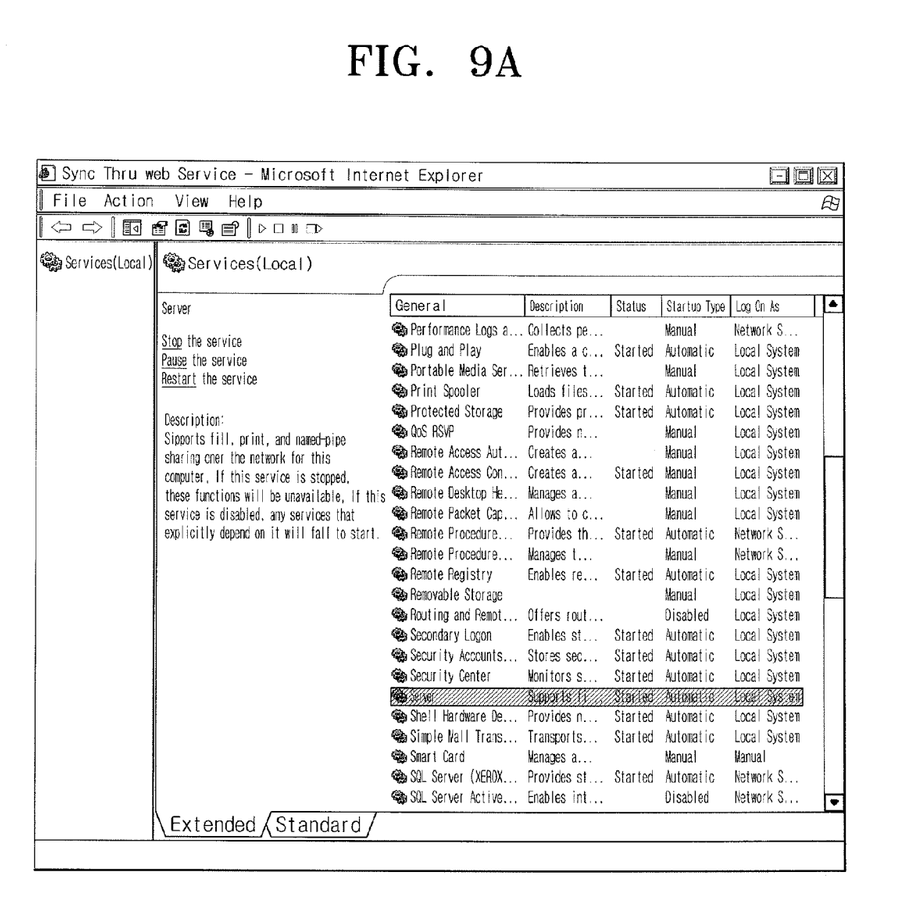
FIG. 9A is a diagram illustrating the serviceability check of the host apparatus thereof.

When the host apparatus 500 can provide the service, the first confirmer 532a checks whether the folder share service is feasible according to the permissions of the user accounts and the file store options.

For example, when there is an anonymous account in the added user accounts, the first confirmer 532a sets the security option such that the anonymous account can use the shared folder. To this end, the first confirmer 532a sets to enable the anonymous user to use the account, grants the access right of the shared folder to the anonymous user, and designates the shared file accessible by the anonymous account.

Figure 9B:
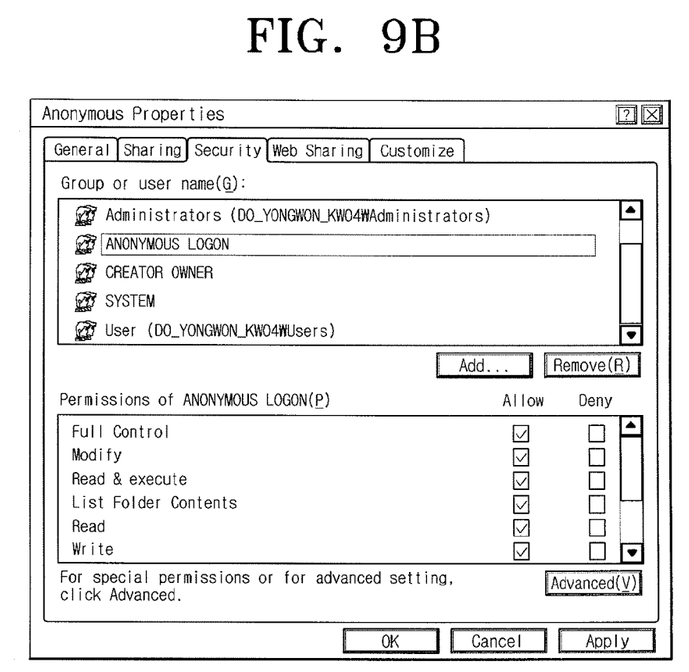
FIG. 9B is a diagram illustrating a UI displaying the added anonymous account.
Figure 9C:
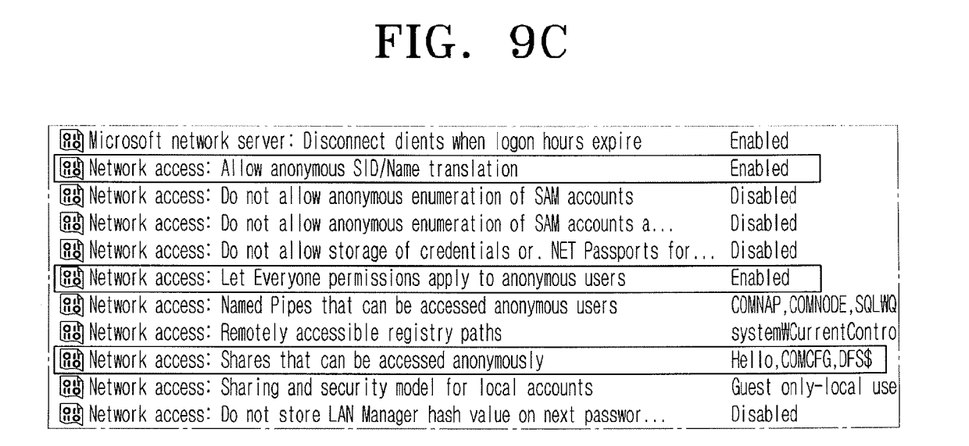
FIG. 9C is a diagram illustrating a security option setup for the anonymous account.

FIG. 9B depicts a UI to display the added anonymous account and FIG. 9C depicts a security option setup for the anonymous account. Referring to FIGS. 9B and 9C, the first confirmer 532a sets to allow a full control to the anonymous account, enables 'Allow anonymous SID/Name translation' and 'Let every permissions apply to anonymous users', and automatically amends to add the shared folder name to 'Shares that can be accessed anonymously' or provides a confirm message so that the user can amend as needed.

When the permissions are given to allow the anonymous account to use the shared folder, the set information is stored to the first storage 540. Accordingly, the first storage 540 contains the setup information including the permissions of the added user account, the folder properties, and the file store options, and the network address of the host apparatus 500. The network address is a host name or an IP address. The host name is either a NetBIOS name or a DNS address.

When the first confirmer 532a completely confirms the host apparatus 500, the requester 532b requests capability of the first device 600 by sending the stored setup information to the first device 600 and negotiates the capability. A protocol used to request and negotiate the capability employs one of network device setup protocols, that is, either a control protocol such as hyper text transfer protocol (HTTP) and simple network management protocol (SNMP), or a network protocol such as TELNET.

For instance, when the first communication portion 550 accesses the first device 600 using the TELNET in response to the request of the requester 532b, the requester 532b requests the capability of the first device 600. A second controller 695 of the first device 600 checks the capability of the first device 600 based on the setup information and then sends the capability to the host apparatus 500 using the TELNET. When the resolution of the file store options set through the UI generator 531 is greater than a processable resolution of the first device 600, the first device 600 informs the host apparatus 500 of a message indicative of the non-processability together with the processable resolution.

The compensator 532c amends the setup information stored to the first storage 540 based on the capability of the first device 600 with respect to the setup information received from the first device 600. For example, the compensator 532c modifies the stored resolution to the processable resolution of the first device 600. The modified setup information is updated to the first storage 540. Thus, the setup information negotiation is completed.

After the setup information negotiation, the service controller 533 enters a test mode of the folder share service so that the first device 600 tests the folder share service based on the modified setup information. To this end, the first communication portion 550 transmits configuration data including the modified setup information and the network address of the host apparatus 500, to the first device 600.

Referring back to FIG. 5, the first device 600 includes an operation panel 605, a second storage 610, a tester 620, a data processor 630, a web user interface (WUI) 640, an image processor 650, a print portion 660, a scan portion 670, a fax portion 680, a second communication portion 690, and the second controller 695.

The operation panel 605 includes a user interface such as a button and touch panel, a WUI screen, and a display panel to display a status of the first device 600.

The second storage 610 contains control programs required to realize functions of the first device 600, a program for the folder share service, the modified setup information and the network address received from the host apparatus 500, a first DNS address and a first WINS address known to the first device 600, and a test file.

The tester 620 tests whether the folder share service is executable using the modified setup information and the network address received through the second communication portion 690, which will be further described.

When the folder share service is actually used, the data processor 630 processes the file or the data to be sent to the host apparatus 500 to a transmittable format using a dedicated protocol. The dedicated protocol can be an SMB protocol by way of example, but not limited to this protocol. Any protocol supporting the folder share service can be employed.

The WUI 640 processes the web based user interface using the network protocol such as HTTP. For example, the WUI 640 provides a UI to display the setup information and the network address received from the host apparatus 500 (FIG. 4) in advance for the folder share service, to be explained. Hence, the user does not have to input the necessary information in the UI one by one and can modify only the intended information through the UI.

The image processor 650 processes data to be printed to a printable format and processes the scanned digital data to a displayable format.

The print portion 660 prints the processed print data on printing media. The scan portion 670 generates digital data by scanning a document. The fax portion 680 converts data to be faxed using a modem and sends the data to a recipient over a telephone network.

The second communication portion 690 communicates with the host apparatus 500 (FIG. 4) in a wired or wireless manner, and communicates with another computer through an interface such as a universal serial bus (USB).

The second controller 695 controls the above operations using the control programs stored to the second storage 610.

Now, operations of the tester 620 are explained. The tester 620 includes a second confirmer 621, a third confirmer 622, and a level comparer 623.

Referring to FIGS. 4 and 5, the second confirmer 621 confirms the IP and the port number used by the first communication portion 550, that is, used by the host apparatus 500 using the network address received from the first communication portion 550. When the second communication portion 690 fails to access the host apparatus 500 with the received network address, the second confirmer 621 performs the confirming operation as below.

When the received network address of the host apparatus 500 is a host name, the second confirmer 621 accesses the first DNS server using the first DNS address stored to the second storage 610 and confirms the IP corresponding to the received host name. When failing to confirm the IP of the host apparatus 500, the second confirmer 621 confirms the IP of the host apparatus 500 by accessing the DNS server using the DNS address contained in the network address receive from the host apparatus 500.

When the received network address of the host apparatus 500 is a NetBIOS name, the second confirmer 621 accesses the first WINS server using the first WINS address stored to the second storage 610 and confirms an IP corresponding to the received NetBIOS name. When failing to confirm the IP of the host apparatus 500, the second confirmer 621 confirms the IP of the host apparatus 500 by accessing the WINS server using the WINS address contained in the network address received from the host apparatus 500.

Figure 10:
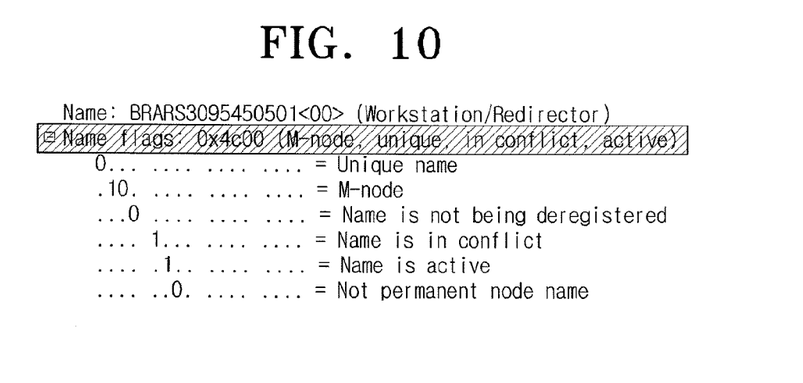
FIG. 10 is a diagram illustrating the name conflict in the connection with the host apparatus.

FIG. 10 depicts a name conflict in a connection with the host apparatus.

Referring to FIGS. 4, 5 and 10, when the name conflict occurs while connecting to the host apparatus 500 with the host name or the NetBIOS name, the second confirmer 621 stores the confirmed IP address to the second storage 610. That is, in the name conflict, the IP of the host apparatus 500 is stored to the second storage 610 instead of the host name or the NetBIOS name. For example, the name conflict may happen when there is another device using the same name.

Upon confirming the IP of the host apparatus 500, the second confirmer 621 confirms the port number of the host apparatus 500. For example, when the folder share service adopts the SMB protocol, the SMB port uses 139 port to use the NetBIOS session and uses 445 port for the SMB direct connection without the NetBIOS session. The second confirmer 621 can confirm the available port to connect to the host apparatus 500 by combining the DNS address and the WINS address used to confirm the IP with the two ports.

After confirming the IP and the port number of the host apparatus 500, the second communication portion 690 connects to the first communication portion 50 using the confirmed IP and port number. After the connection, the level comparer 623 performs authentication. In specific, the level comparer 623 checks whether the first device 600 can support the security level of the host apparatus 500 by comparing the preset security level of the first device 600 with the preset security level of the host apparatus 500. The security level of the host apparatus 500 is contained in the register 561, and the security level of the first device 600 is contained in a register (not illustrated) of the second controller 695.

When the two security levels are different from each other, the host apparatus 500 or the first device 600 adjusts one of the two security levels through the negotiation. For example, when the security level of the host apparatus 500 is higher than that of the first device 600, the first controller 560 lowers the security level of the host apparatus 500 to a security level supportable by the first device 600, or the second controller 695 raises the security level of the first device 600 to the security level of the host apparatus 500.

When the security level of the host apparatus 500 is lower than that of the first device 600, the first controller 560 raises the security level of the host apparatus 500 to a supportable security level of the first device 600, or the second controller 695 lowers the security level of the first device 600 to the security level of the host apparatus 500. The security level can be adjusted automatically or manually by an administrator.

For Windows registry, the security level has 6 levels as illustrated in Table 1.

TABLE 1

| Level | Meaning |
|---|---|
| | Send LM response and NTLM response; never use NTLMv2 |
| | Use NTLMv2 session security if negotiated |
| | Send NTLM response only |
| | Send NTLMv2 response only |
| | DC refuses LM responses |
| | DC refuses LM and NTLM responses (accepts only NTLMv2) |

The third confirmer 622 accesses the shared folder of the host apparatus 500 using the modified setup information stored to the second storage 610 and then checks whether the reading and the writing of the share folder are permitted. When the third confirmer 622 cannot read and write in the shared folder, the service controller 533 modifies the permissions to allow the reading and the writing.

As for the reading, the third confirmer 622 receives a file list from the shared folder using the control protocol (e.g., TELNET) and reads a file list from the shared folder using the folder share service protocol (e.g., SMB). When the received file list matches the read file list, the third confirmer 622 determines that the reading is permitted.

As for the writing, when the third confirmer 622 transmits the stored test file to the shared folder, the service controller 533 can learn that the test file is stored by checking the shared folder.

When the reading and writing tests are successfully finished, the second controller 695 stores the setup information received from the host apparatus 500 to the second storage 610 and controls the second communication portion 690 to inform the host apparatus 500 of the setup. The second controller 695 controls the second communication portion 690 to finish the control protocol connection and the service protocol connection with the host apparatus 500. As such, the setup information for the folder share service, which is set and modified at the host apparatus 500, and the network address of the host apparatus 500 are stored to the first device 600.

The second controller 695 controls the WUI 640 to generate a UI illustrating the setup information for the folder share service and the network address of the host apparatus 500 and to notify the user of the setup information and the network address.

When there is another device to be permitted to access the shared folder, the host apparatus 500 repeats the above operations.

Figure 11:
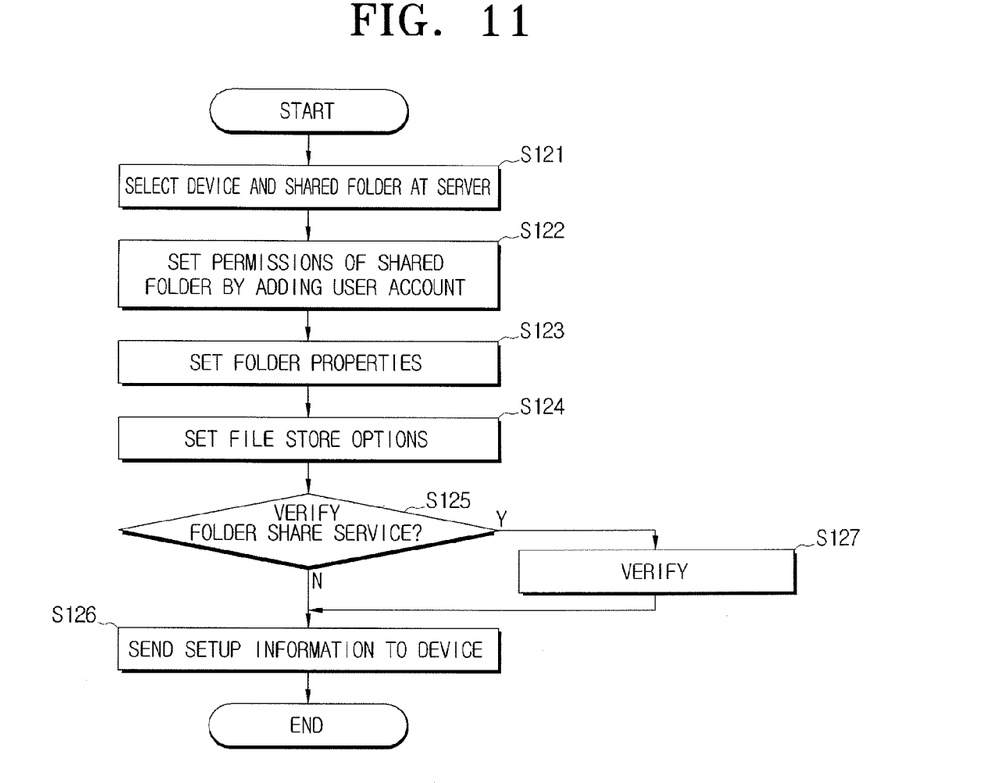
FIG. 11 is a flowchart illustrating the folder share service setup method according to an embodiment of the present general inventive concept.

FIG. 11 is a flowchart illustrating the folder share service setup method according to an embodiment of the present general inventive concept.

Referring to FIGS. 2 through 11, when the user requests to execute the manager program for the folder share service, the UI generator 531 generates the UIs of FIGS. 6A, 6B and 6C so that the user selects a device to setup the folder share service and a shared folder (operation S121).

For instance, when the first device 600 and 'ShareFolder' as the shared folder are selected in operation S121, the service controller 533 of the manager program requests the first controller 560 to generate UIs required to add the user account and to set the permissions of the shared folder.

The UI generator 531 generates the UIs of FIGS. 7A and 7B under the control of the first controller 560, and the user adds the user account through the generated UI and sets the permissions of the shared folder for the added user account (operation S122). At this time, when the plurality of user accounts or the single user account is added, the permissions can be automatically set by the service controller 533 to allow the reading and the writing.

The service controller 533 automatically sets the properties of the shared folder, that is, the properties allowing the data writing and the data reading (operation S123).

Next, the user sets the store options of the file through the UI of FIG. 8 (operation S124).

When the verification of whether the folder share service is available is not requested by the information set in operations S121 through S124 (operation S125), the setup information, that is, the permissions for the user account and the file store options are transmitted to the first device 600 through the first communication portion 550 over the communication network 10 (operation S126).

By contrast, when the verification of the folder share service is requested (operation S125), the service controller 533 controls the verifier 532 to perform the verification and requests the verification to the first device 600 (operation S127).

Figure 12:
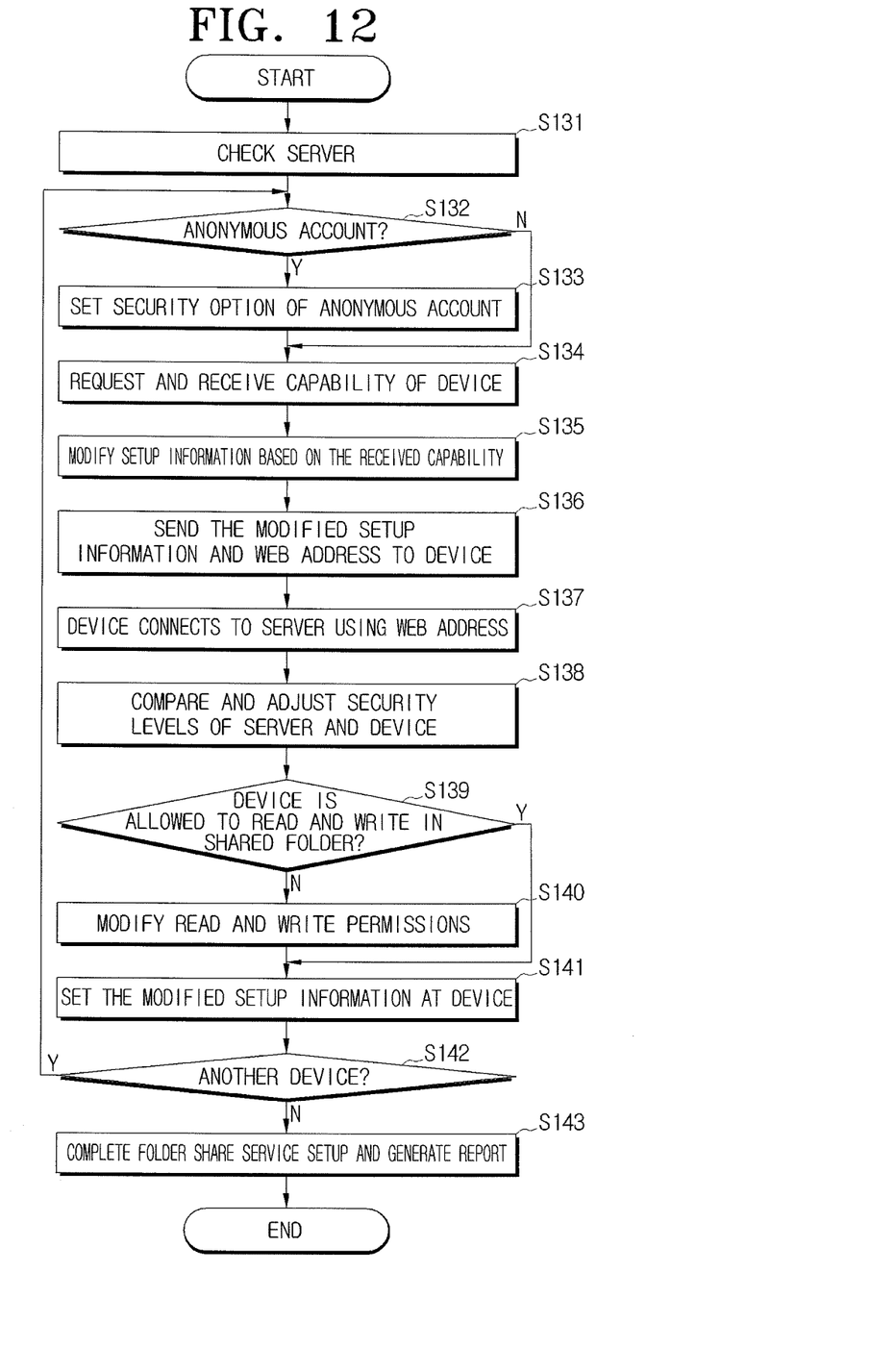
FIG. 12 is a detailed flowchart illustrating the verifying operation of FIG. 11.

FIG. 12 is a detailed flowchart of the verifying operation of FIG. 11.

Referring to FIGS. 4, 5 and 12, the first confirmer 532a of the host apparatus 500 checks whether the host apparatus 500 can provide the folder share service using the information of the register 561 (operation S131).

When the host apparatus 500 can provide the service and there is an anonymous account in the added user accounts in operation S122 (operation S132), the first confirmer 532a sets the security option such that the anonymous account can use the shared folder (operation S133).

The setup information including the permissions for the added user account, the folder properties, the file store options, and the network address of the host apparatus 500 are stored to the first storage 540.

Next, the requester 532b requests the capability of the first device 600 by transmitting the setup information set in operations S122 through S124 and S133 to the first device 600 and receives evaluated capability from the first device 600 (operation S134). In doing so, the first communication portion 550 adopts the SMB or other protocol excluding CFIS. When there is information unsupportable by the first device 600 by analyzing the setup information, the first device 600 informs the host apparatus 500 of the unsupportable information.

The compensator 532c modifies the setup information stored to the first storage 540 based on the capability of the first device 600 (operation S135). The modified setup information is updated to the first storage 540 and the negotiation of the setup information is completed.

Next, the service controller 533 enters the test mode of the folder share service so that the first device 600 tests the folder share service based on the modified setup information. For doing so, the first communication portion 550 transmits configuration data including the modified setup information and the network address of the host apparatus 500 to the first device 600 (operation S136). The configuration data is stored to the second storage 610.

The second confirmer 621 of the first device 600 confirms the IP and the port number of the host apparatus 500 using the network address received from the first communication portion 550, and the second communication portion 690 connects to the host apparatus 500 with the confirmed IP and port number (operation S137).

Next, the level comparer 623 performs the authentication (operation S138). In specific, by comparing the security level of the first device 600 with that of the host apparatus 500, the level comparer 623 adjusts one of the two security levels when the two security levels are different from each other so that the first device 600 can support the security level of the host apparatus 500.

Next, the third confirmer 622 accesses the shared folder of the host apparatus 500 using the modified setup information stored to the second storage 610 and checks whether the reading and the writing in the shared folder are allowed (operation S139).

When the reading and the writing are not allowed, the compensator 532c of the host apparatus 500 modifies the permissions to allow the reading and the writing (operation S140).

Next, the second controller 695 sets the setup information received from the host apparatus 500 to the first device 600 and informs the host apparatus 500 of the setup completion (operation S141). Thus, the first device 600 stores the setup information for the folder share service set and modified at the host apparatus 500 and the network address of the host apparatus 500, that is, stores the configuration data.

The WUI 640 of the first device 600 generates the UIs illustrating the setup information for the folder share service and the network address of the host apparatus 500 and reports to the user (operation S143).

When there is another device to be permitted to access the shared folder (operation S142), the host apparatus 500 performs operations S132 through S141 or S134 through S141.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to various embodiments of the host apparatus, the device, and the method to setup the folder share service, since the host apparatus serving as the server enables to set the information required for the folder share service, the information can be set easily and accurately. Particularly, some information such as the reading and writing permissions among the information set through the conventional completed operations is automatically set at the host apparatus, to thus maximize user convenience.

The user can easily set the necessary information at the host apparatus, without having to set the setup information at both the device and the host apparatus.

Specifically, setting the information (e.g., the user add and password setup, the read and write permissions of the shared folder, the permission setup for each user account, the domain and workgroup designation of the shared folder, and the security level setup), which has been setup in several programs of the operating system such as Windows, in one way by means of the single manager program in association with the operating system is possible.

Although various embodiments of the present general inventive concept have been illustrated and described, it would be appreciated by those skilled in the art that changes may be made in this embodiment without departing from the principles and spirit of the general inventive concept the scope of which is defined in the claims and their equivalents.

What is claimed is:

1. A host apparatus to setup a folder share service, the host apparatus comprising:
   a display;
   a controller to control displaying a user interface (UI) screen to select an image forming apparatus using the folder share service and a shared folder stored in the host apparatus, and a UI screen to set permissions of the selected shared folder corresponding to at least one added user account and to set store options of a file to be stored to the shared folder in the display; and
   a first communication portion to transmit setup information of the user account to the image forming apparatus without transmitting a file of the shared folder to the image forming apparatus such that the image forming apparatus performs an operation associated with the shared folder according to the transmitted setup information,
   wherein the setup information comprises information necessary to access the shared folder and modify its contents, and
   wherein once the setup information is generated, such setup information is transmitted to the image forming apparatus automatically.

2. The host apparatus of claim 1, further comprising:
   a verifier to verify whether the folder share service is available by the set user permissions and the file store options; and
   a service controller to control the verifier to verify the folder share service.

3. The host apparatus of claim 2, wherein the verifier, when the added user account is an anonymous account, sets a security option to allow the anonymous account to use the shared folder.

4. The host apparatus of claim 1, wherein the file to be stored to the shared folder comprises:
   at least one of data scanned at the image forming apparatus, print data, e-mail transceiving data, and faxed data.

5. A folder share service setup method, the method comprising:
   selecting an image forming apparatus using a folder share service and a shared folder of a server, the shared folder being stored in the server;
   setting, at the server, permissions of the selected shared folder corresponding to a user account and setting store options of a file to be stored to the folder; and
   transmitting setup information for the user account to the image forming apparatus without transmitting a file of the shared folder to the image forming apparatus such that the image forming apparatus performs an operation associated with the shared folder according to the transmitted setup information,
   wherein the setup information comprises information necessary to access the shared folder and modify its contents, and
   wherein once the setup information is generated, such setup information is transmitted to the image forming apparatus automatically.

6. The folder share service setup method of claim 5, wherein the permission setting operation sets to add at least one user account.

7. The folder share service setup method of claim 5, further comprising:
   verifying whether the folder share service is available by the set permissions and the file store options.

8. The folder share service setup method of claim 7, wherein the verifying operation comprises:
   when the added user account is an anonymous account, setting a security option to allow the anonymous account to use the shared folder.

9. The folder share service setup method of claim 7, wherein a device capability requesting and receiving operation and a testing operation are performed according to different protocols.

10. The folder share service setup method of claim 9, wherein the test and the folder share service are performed according to a server message block (SMB) protocol.

11. The folder share service setup method of claim 9, wherein the device capability requesting and receiving operation is performed according to one of a hypertext transfer protocol (HTTP), a simple network management protocol (SNMP), and a TELNET.

12. The folder share service setup method of claim 5, further comprising:
when a security level of the server is different from a security level of the image forming apparatus, adjusting the two security levels to the same level.

13. The folder share service setup method of claim 5, further comprising:
informing a user of the setup information set for the folder share service.

14. The folder share service setup method of claim 5, wherein the file to be stored to the shared folder comprises:
at least one of data scanned at the image forming apparatus, print data, e-mail transceiving data, and faxed data.

15. A method of setting up a folder share service, the method comprising:
requesting a controller to generate one or more user interfaces;
generating the one or more user interfaces;
automatically setting permissions to allow reading and writing of a shared folder stored at the controller based on input through the one of the user interface by a user;
setting store options of a file based on input through an other user interface by the user; and
determining whether a request is made for verification of availability of the folder share service,
wherein the permissions and the file store options are transmitted to an image forming apparatus without transmitting a file of the shared folder to the image forming apparatus, when a determination is made that the request was not made, and a verifier is controlled to perform the verification and requesting the verification to the image forming apparatus when the determination is made that the request was made.

* * * * *